United States Patent
Cesario, Jr.

(10) Patent No.: US 7,349,531 B2
(45) Date of Patent: *Mar. 25, 2008

(54) EXEMPTING CERTAIN INCOMING CALLERS FROM SCREENING BY A PRIVACY SYSTEM

(75) Inventor: James C. Cesario, Jr., Centerville, GA (US)

(73) Assignee: AT&T Delaware Intellectual Property, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/463,590

(22) Filed: Aug. 10, 2006

(65) Prior Publication Data

US 2007/0047710 A1    Mar. 1, 2007

Related U.S. Application Data

(63) Continuation of application No. 10/218,133, filed on Aug. 12, 2002, now Pat. No. 7,103,162.

(51) Int. Cl.
    *H04M 1/56* (2006.01)

(52) U.S. Cl. .............................. 379/142.01; 379/142.17

(58) Field of Classification Search ................
    379/142.01–142.05, 142.17, 88.19, 88.21,
    379/93.23, 201.11, 207.15
    See application file for complete search history.

(56) References Cited

U.S. PATENT DOCUMENTS

| | | | |
|---|---|---|---|
| 6,771,754 B2 * | 8/2004 | Pelletier et al. ......... | 379/142.01 |
| 7,103,162 B1 * | 9/2006 | Cesario, Jr. ............ | 379/142.01 |

* cited by examiner

*Primary Examiner*—Barry Taylor
(74) *Attorney, Agent, or Firm*—Withers & Keys, LLC

(57) ABSTRACT

A privacy system determines in connection with a call from a particular calling party whether a name identification thereof is available, and if so allows the call to be put through to the called party with the name identification. The called party thus can review the name identification of the calling party prior to determining whether to answer the call. The privacy system includes a list of privileged calling parties with respect to and as specified by the called party, and if the name identification is not available, the privacy system determines whether the calling party is on such list. If so, the privacy system allows the call to be put through to the called party without the name identification.

17 Claims, 3 Drawing Sheets

EXEMPTING CERTAIN INCOMING CALLERS FROM SCREENING BY A PRIVACY SYSTEM

This application is a continuation of application Ser. No. 10/218,133, filed on Aug. 12, 2002, now U.S. Pat. No. 7,103,162 and entitled EXEMPTING CERTAIN INCOMING CALLERS FROM SCREENING BY A PRIVACY SYSTEM.

FIELD OF THE INVENTION

The present invention relates to a privacy system that screens calls from a pre-defined class of calling parties prior to putting the each such call through to a called party, and to a method for exempting certain incoming calling parties from being screened by the privacy system. More particularly, the present invention relates to a method for the called party to selectively exempt such certain incoming calls.

BACKGROUND OF THE INVENTION

In recent years, a number of new telephone service features have been provided by an Advanced Intelligent Network (AIN). The AIN evolved out of a need to increase the capabilities of the telephone network architecture in order to meet the growing needs of telephone customers or users. Additionally, as the number of people who rely on the Internet for communication increases, so does the demand for the electronic transfer of data.

Referring now to FIG. 1, it is seen that an AIN-based network arrangement is provided within and/or in conjunction with a wire line telephone system LATA (Local Access and Transport Area) 101 that defines a calling service area. Note that a similar arrangement is also provided with and/or in conjunction with a wireless telephone system. The LATA 101 includes stations (i.e. telephone lines and telephone equipment at the ends thereof) 103 and corresponding service switching points (SSPs) 105 (i.e., end offices or central offices). The SSPs 105 are each programmable switches which: recognize AIN-type calls; launch queries to service control points (SCPs) 107 (only one being shown in FIG. 1); and receive commands and data from SCPs 107 to further process and route AIN-type calls. A signal transfer point (STP) 109 may be employed to route signals between the SSPs 105, the SCPs 107, and other network elements. When one of the SSPs 105 is triggered by an AIN-type call, the triggered SSP 105 formulates an AIN service request and responds to call processing instructions from the network element in which the AIN service logic resides, typically at an SCP 107.

One type of event that may be arranged to set off an AIN trigger in an SSP 105 or the like is a call from a calling party that is unable to or refuses to provide an identification of itself to a called party that requires such an identification. Such identification is typically a name of the calling party in addition to a telephone number thereof. More particularly, the called party may wish to have the name identification of the calling party prior to determining whether to answer the call, and may in fact subscribe to a service that presents such name identification to the called party. Such a name identification service may of course be provided as a non-AIN service.

Inasmuch as the called party may wish to have the name identification of the calling party, the calling party may wish to refuse to provide the name identification, or such name identification may not be available for technical reasons. In particular, the name identification may be unavailable based on network equipment and protocols, especially between networks, based on locale, or based on the calling party affirmatively blocking such identification. Such a blocking service may be provided to the calling party as an AIN or non-AIN service.

In the circumstance where the name identification is not presented to the calling party, such called party may wish to have the call terminated prior to being connected thereto, and may in fact subscribe to such a 'privacy' service to screen such calls, where the privacy service may be AIN- or non-AIN-based. In such a case, the called party is never made aware that the call was attempted inasmuch as the privacy service intercepts the call prior to the call being put through. Similarly, in such circumstance, such called party may wish to be connected to the call only if the calling party is given an opportunity to provide the identification, and may in fact subscribe to such a modified privacy service to screen such calls, where the modified privacy service also may be AIN- or non-AIN-based. In such a case, the called party may be made aware that the call is attempted prior to the call being put through, but is not connected to the call until the called party affirmatively chooses such course of action, perhaps based on whether the calling party provides the identification and on whether the identification is acceptable to the called party.

A problem arises in connection with the privacy or modified-privacy (hereinafter 'privacy') service in that the called party may wish to receive calls from certain calling parties without any screening. For example, such certain calling parties may be a friend or relative of the called party, a doctor, a hospital, etc. In the case where the call is terminated prior to being connected if the name identification is not presented, it may be that the called party knows that it wants to receive calls from a certain calling party based on a telephone number thereof, but that the corresponding name identification is blocked or otherwise cannot be presented. In such a situation, despite wanting to receive calls from the calling party, such calls will be blocked based on the failure to present the identification.

Similarly, in the case where the call is terminated only after the calling party fails to given a name identification after being provided with an opportunity to do so, it likewise may be that the called party knows that it wants to receive calls from a certain calling party based on a telephone number thereof, and therefore does not need for the calling party to be bothered with providing the corresponding identification if blocked or otherwise not presented. In such a situation, despite wanting to receive calls from the calling party without the aforementioned bother, such calling party nevertheless will have to suffer the bother based on the failure to present the identification.

Accordingly, a need exists for a method and mechanism by which the called party subscribing to the privacy service can identify privileged calling parties that are not required to be screened by the privacy service. More particularly, a need exists for such a method and mechanism by which the calling party can set forth telephone numbers of such privileged calling parties. Thus, when a privileged calling party calls a called party subscribing to a privacy service, the privileged calling party is not screened by the privacy service and the call is connected to the called party without any bother to the calling party.

SUMMARY OF THE INVENTION

The present invention satisfies the aforementioned need by providing a privacy system implemented as a service to a called party by a telephone service provider of the called party. The called party wishes to have a name identification of each calling party making a call to such called party prior to determining whether to answer such call and thus subscribes to a name identification service as provided by the telephone service provider. The name identification service obtains the name identification if available and displays such name identification to the called party. However, the name identification of particular ones of each calling party are not available.

The privacy system determines in connection with a call from a particular calling party whether the name identification of the calling party is available, and if the name identification is available, allows the call to be put through to the called party with the name identification. The called party thereby is able to review the name identification of the calling party prior to determining whether to answer the call.

The privacy system includes a list of privileged calling parties with respect to and as specified by the called party, and if the name identification is not available, the privacy system determines whether the calling party is on the list of privileged calling parties for the called party. If the calling party is on the list, the privacy system allows the call to be put through to the called party without the name identification.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
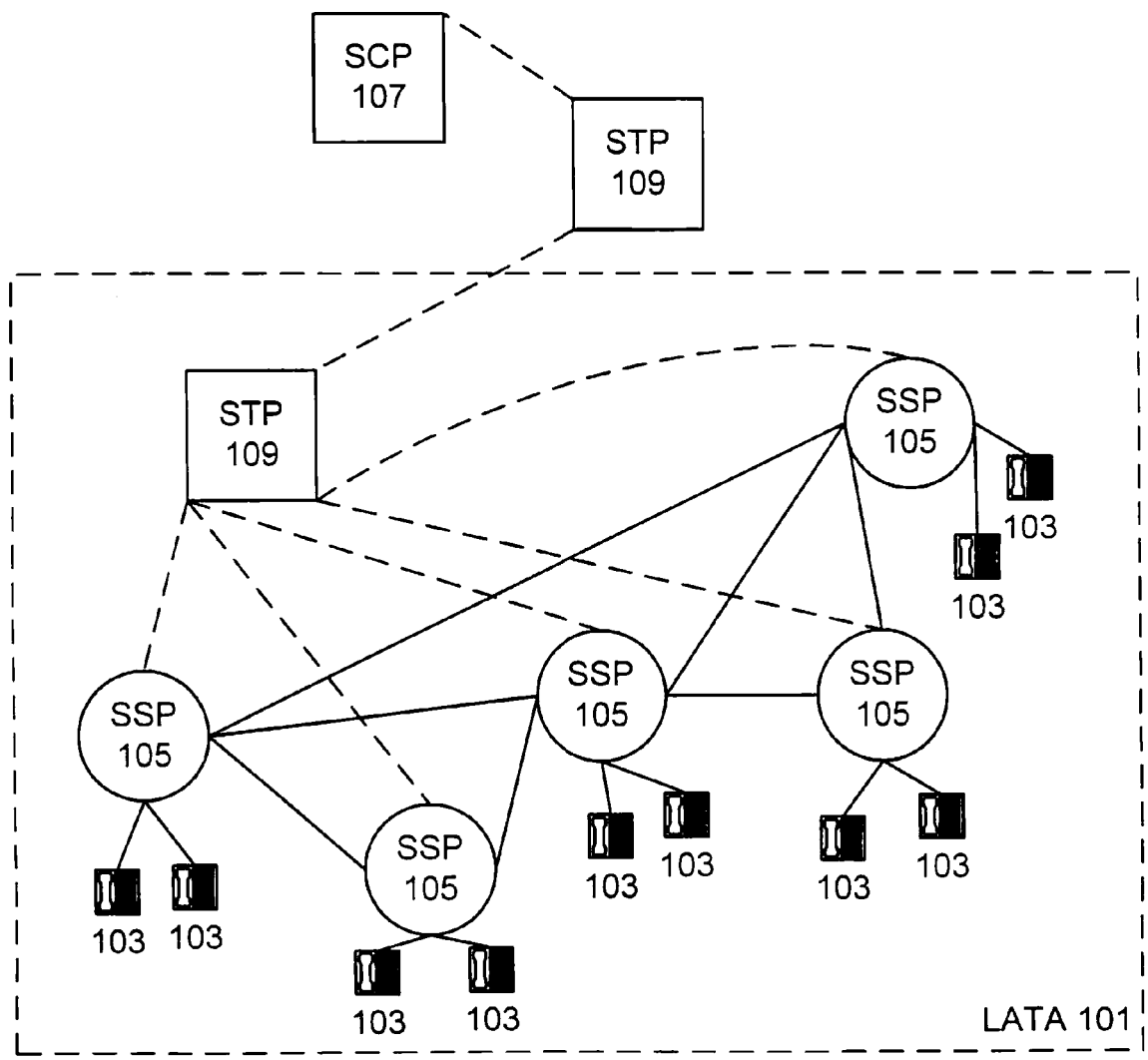
FIG. 1 is a block diagram showing a typical AIN-based telephone network such as may be employed in connection with the present invention.
Figure 2:
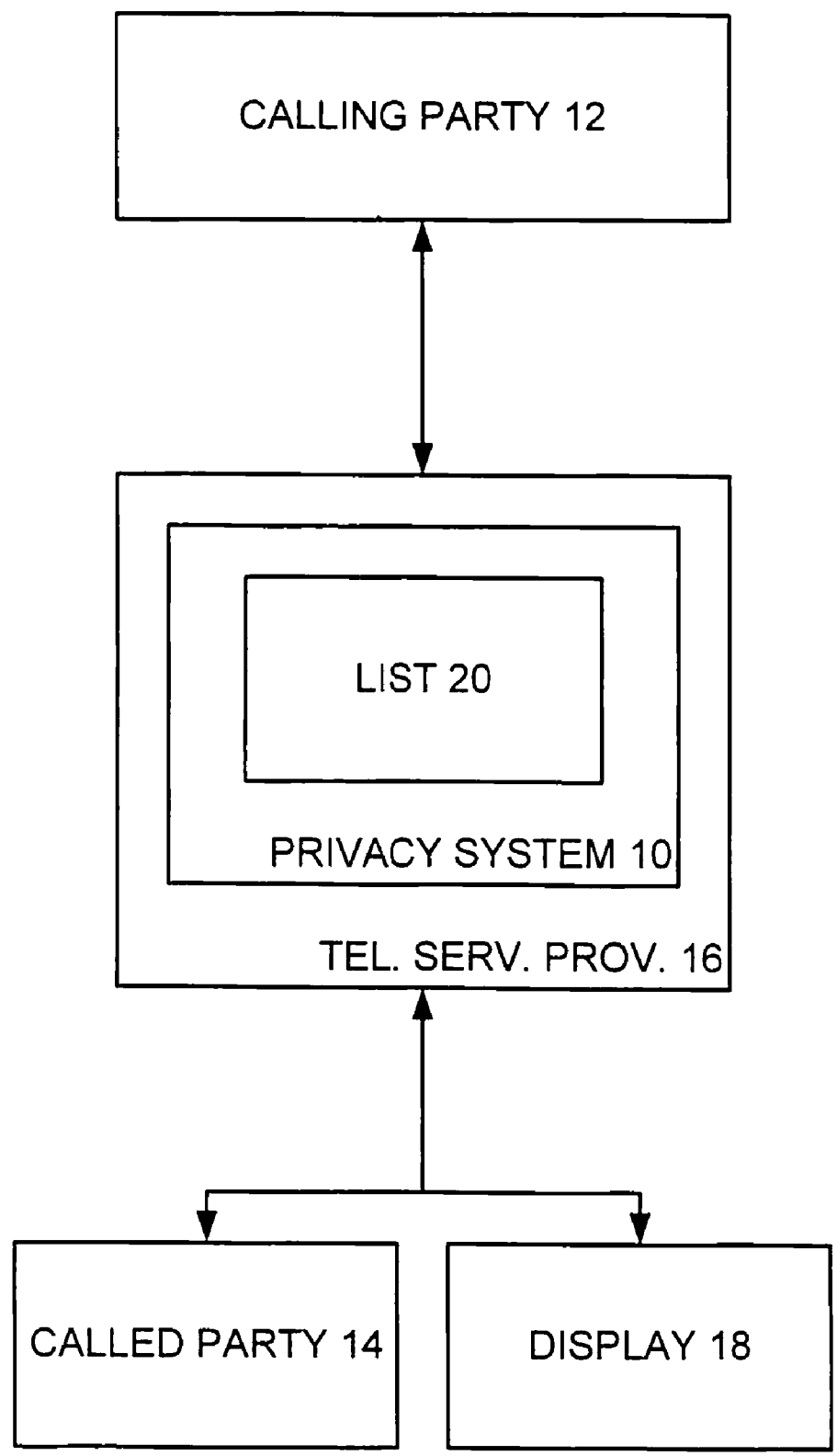
FIG. 2 is a block diagram showing a calling party calling a called party by way of a telephone service provider of the called party, where the called party subscribes to a privacy system in accordance with one embodiment of the present invention.

Referring to the drawings in detail, wherein like numerals are used to indicate like elements throughout, there is shown in FIG. 2 a privacy system 10 for providing a privacy service that screens each call for a called party 12 from any calling party 14. Typically, the privacy system 10 is implemented as a service to the called party 14 by the telephone service provider 16 of the called party 14, and is at least partially implemented at an SSP 105 or central office administered by the telephone service provider 16. The privacy system 10 may be AIN-based or non-AIN based without departing from the spirit and scope of the present invention.

As was set forth above, the called party 14 may wish to have an identification of the name of each calling party 12 prior to determining whether to answer the call, and may in fact subscribe to a name identification service as provided by the telephone service provider 16, where the name identification service obtains the name identification and displays such identification to the called party 14 on an appropriate display 18. Such name identification is typically in addition to a telephone number thereof. The name identification is displayed on the display 18 concurrent with the call, and with such displayed identification the called party 14 can decide if it wishes to answer the call, let the call be answered by an answering machine, etc.

As was also set forth above, the calling party 12 may wish to refuse to provide the name identification and affirmatively block presentation of such identification. For example, the calling party 12 may be a telemarketer who believes that the displayed identification will lessen the likelihood that the called party 14 will answer. Alternatively, the name identification of the calling party 12 is not provided to the telephone service provider 16 of the called party for technical reasons. For example, the telephone service provider 16 of the calling party 12 (not shown) may have antiquated equipment that does not ordinarily provide such identification as part of setting up the call with the telephone service provider 16 of the called party 14.

Thus, the privacy system 10 screens each incoming call for the called party 14 to determine if a name identification of the calling party 12 has been presented. If presented, the privacy system 10 allows the call to be put through to the called party 14 along with the name identification, and the called party reviews the name identification in the display 18 to determine whether it wishes to answer the call. If not presented, the privacy system 10 either terminates the call without putting the call through to the called party 14, or gives the calling party 12 an opportunity to present a name identification. In the latter case, it may be that the privacy system 10 prompts the calling party to give a spoken identification, collects same, and forwards same to the called party 14 prior to allowing the call to be put through. Typically, the call is in fact put through only after the called party 14 reviews the spoken identification and affirmatively decides to receive the call.

Notably, the privacy system 10 heretofore has indiscriminately screened all incoming calls for the called party 14. Thus, all parties were screened, including those that the called party 14 may have wished to answer directly even without any presented name identification or without bothering the calling party 12 to provide a spoken identification.

Accordingly, in one embodiment of the present invention, the privacy system 10 is modified to include for the called party 14 a list 20 of telephone numbers of privileged calling parties 12 that are to be put through directly to such called party 14 regardless of any lack of presented name identification. Thus, the called party 14 can specify in the list 20 telephone numbers of friends, relatives, business associates, and other privileged calling parties 12 that the privacy system 10 is to put through directly without screening, even if such privileged calling parties 12 do not present name identification.

The called party 14 may specify and modify the list 20 in any appropriate manner without departing from the spirit and scope of the present invention. For example, the called party 14 may enter and edit the list 20 by way of a computer connected to the privacy system 10 over a network such as the Internet (not shown), or may enter and edit the list 20 by accessing the privacy system 10 over the telephone network by way of a specified telephone number.

In one embodiment of the present invention, the list 20 is based on the telephone number or telephone numbers of each privileged calling party 12 inasmuch as the telephone number of a calling party 12 is usually presented to the telephone service provider 16 of the called party 14 even if the name of such called party 14 is not likewise presented. Thus, the telephone number of the calling party 12 as presented to the telephone service provider 16 of the called party 14 may be forwarded to the privacy system 10 and compared to the list 20 of the called party 14 to determine whether the calling party 12 has been specified by the called party 12 as being privileged and not requiring screening by the privacy system 10. Of course, the list 20 may be based on indicia other than the telephone number of the calling party 12 without departing from the spirit and scope of the present invention.

Figure 3:
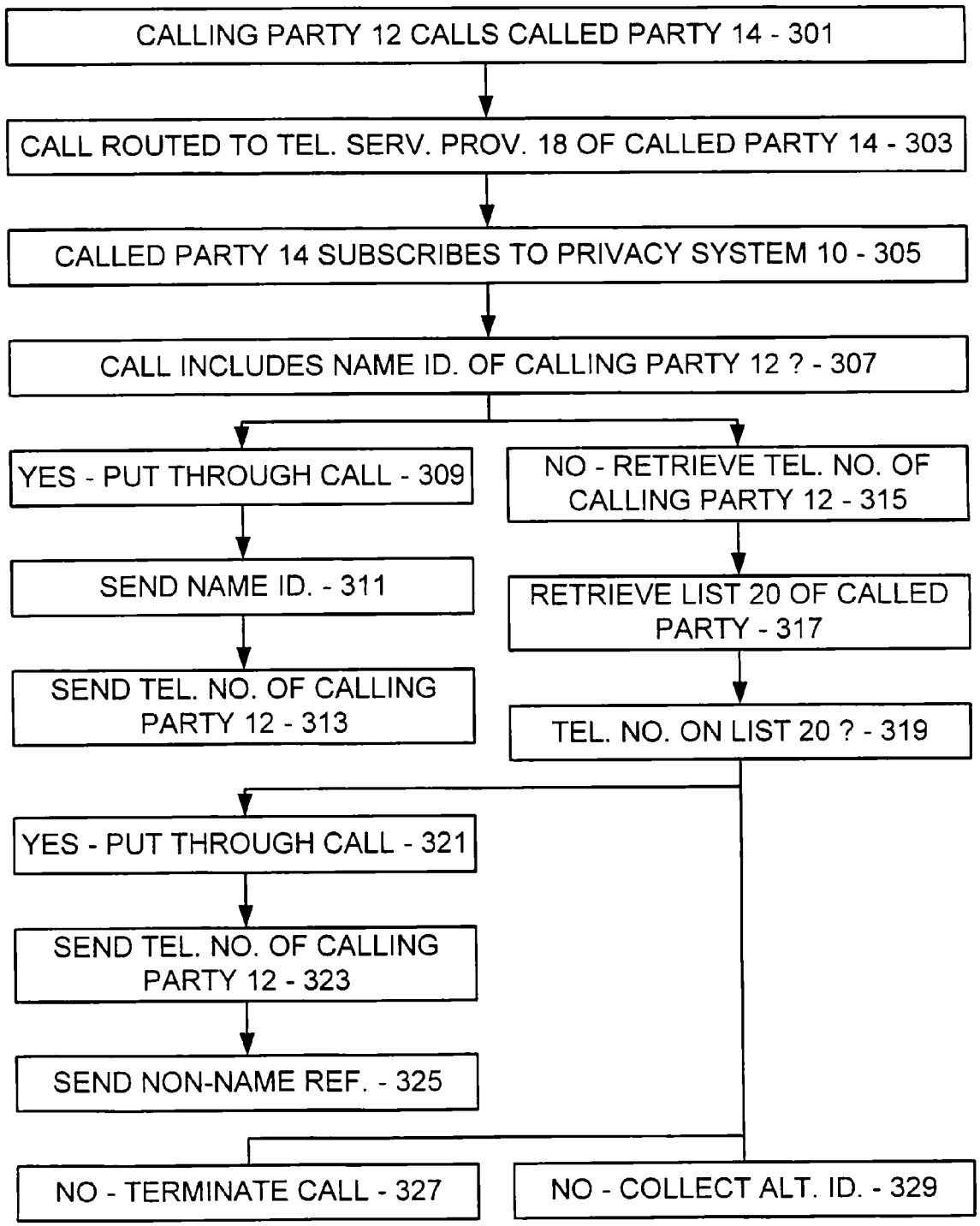
FIG. 3 is a flow diagram showing steps performed in connection with the call from the calling party to the called party of FIG. 2.

In one embodiment of the present invention, and referring now to FIG. 3, a method for processing a call from a calling party 12 to a called party 14 by way of the privacy system 10 and the list 20 is as follows:

The process begins when a calling party 12 places a call to a called party 14 at a telephone service provider 16, where the called party 14 subscribes to the privacy system 10 and maintains a list 20 such as was set forth above (step 301). As was set forth above, the call includes at a minimum a telephone number or the like that identifies the telephone line or the like being employed by the calling party 12, and may or may not also include an identification of the calling party 12 in the nature of a name of the calling party 12 or the like. As was also set forth above, the called party 14 in subscribing to the privacy system 10 does not normally wish to receive the call if the name identification is blocked or not otherwise provided.

In the normal course, the call is routed to the telephone service provider 18 of the called party 14 (step 303), where it is noted that the called party 14 subscribes to the privacy system 10 (step 305). Accordingly, and in accordance with the privacy system 10, the call is examined to determine whether the call includes the name identification of the calling party 12 (step 307).

Assuming the call indeed does include the name identification of the calling party 12, the call is put through to the called party 14 (step 309) and the name identification is sent with the call to be displayed on the display 18 that is present at and available to the called party 14 (step 311). In addition, the telephone number of the calling party 12 may also be sent with the call to be displayed on the display 18 (step 313).

However, if the call does not include the name identification of the calling party 12, the telephone number associated with the calling party 12 is retrieved (step 315), the list 20 as set up by the called party 14 is retrieved (step 317), and it is determined whether the telephone number is on the list 20 (step 319).

If the telephone number is indeed on the list 20, the call is put through to the called party 14 (step 321). Here, of course, no name identification is sent with the call, although the telephone number of the calling party 12 may be sent with the call to be displayed on the display 18 (step 323), and a suitable reference ('ON LIST', e.g.) may also be sent with the call to be displayed on the display 18 (step 325).

If the telephone number is not on the list 20, the call may be terminated (step 327). Alternatively, the calling party 12 may be given an opportunity to provide some sort of name identification or the like, perhaps by voice (step 329). As before, the called party 14 may be made aware that the non-name identification call is attempted prior to such call being put through, but is not connected to such call until the called party 14 affirmatively chooses such course of action, perhaps based on whether the calling party 12 provides the identification and on whether the identification is acceptable to the called party.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which the called party 14 subscribing to the privacy system 10 or service can identify privileged calling parties 12 that are not required to be screened by the privacy service 10. More particularly, the present invention comprises a new and useful method and mechanism by which the calling party 14 can set forth a list 20 of telephone numbers of such privileged calling parties 12. Thus, when a privileged calling party 12 calls a called party 14 subscribing to the privacy service 10, the privileged calling party 12 is not screened by the privacy service 10 and the call is connected to the called party 14 without any bother to the calling party 12. It should be appreciated that changes could be made to the embodiments described above without departing from the inventive concepts thereof. Notably, the present invention is equally applicable to wire line and wireless telephone systems. It should be understood, therefore, that this invention is not limited to the particular embodiments disclosed, but it is intended to cover modifications within the spirit and scope of the present invention as defined by the appended claims.

The invention claimed is:

1. A privacy system implemented as a service to a called party by a telephone service provider of the called party, the called party wishing to have a name identification of each calling party making a call to such called party prior to determining to answer such call subscribing to a name identification service as provided by the telephone service provider, the name identification service for obtaining the name identification if available and displaying such name identification to the called party, the name identification of particular ones of each calling party not being available, the privacy system including:

means in connection with a call from a particular calling party for determining whether the name identification of the calling party is available;

means, if the name identification is available, for allowing the call to be put through to the called party with the name identification, the called party thereby being able to review the name identification of the calling party prior to determining whether to answer the call;

a predetermined list of privileged calling parties and at least one telephone number with respect to and as specified by the called party;

means, if the name identification is not available, for determining whether the calling party is on the predetermined list of privileged calling parties for the called party; and means, if the calling party is on the predetermined list, for allowing the call to be put through to the called party without the name identification but with an on-list reference and with the at least one telephone number of the calling party that is associated with the on-list reference, the called party thereby being able to review the on-list reference and the telephone number of the calling party to determine whether to answer the call.

2. The privacy system of claim 1 further comprising means, if the calling party is not on the predetermined list, for terminating the call without putting the call through to the called party.

3. The privacy system of claim 1 further comprising means, if the calling party is not on the predetermined list, for giving the calling party an opportunity to present a name identification.

4. The privacy system of claim 3, further comprising means, if the calling party is not on the list, for prompting the calling party to give a spoken identification, collecting same, and forwarding same to the called party, and means for putting the call through only after the called party reviews the spoken identification and affirmatively decides to receive the call.

5. The privacy system of claim 1, wherein the predetermined list is provided by the called party to the privacy system over an Internet connection to the privacy system.

6. The privacy system of claim 1, wherein the predetermined list is provided by the called party to the privacy system over a telephone call to the privacy system.

7. The privacy system of claim 1, wherein the on list reference comprises 'ON LIST'.

8. The privacy system of claim 1, wherein the means in connection with the call employs AIN signaling.

9. A method of processing a call from a calling party to a called party subscribing to a privacy system, the method comprising the privacy system:
   receiving the call from the calling party;
   determining whether the call includes a name identification of the calling party;
   if the call does not include the name identification of the calling party:
   referencing a predetermined list of privileged calling parties and at least one telephone number with respect to and as specified by the called party;
   determining whether the calling party is on the predetermined list; and
   if the calling party is on the predetermined list, putting the call through to the called party without the name identification but with an on-list reference and with the at least one telephone number of the calling party that is associated with the on-list reference, the called party thereby being able to review the on-list reference and the at least one telephone number to determine whether to answer the call.

10. The method of claim 9 further comprising, if the calling party is not on the list, terminating the call without putting the call through to the called party.

11. The method of claim 9 further comprising, if the calling party is not on the list, giving the calling party an opportunity to present a name identification.

12. The method of claim 11 further comprising, if the telephone number is not on the list, prompting the calling party to give a spoken identification, collecting same, and forwarding same to the called party, and putting the call through only after the called party reviews the spoken identification and affirmatively decides to receive the call.

13. The method of claim 9, wherein the predetermined list is stored within the privacy system.

14. The method of claim 9, further comprising providing by the called party the predetermined list over an Internet connection to the privacy system.

15. The method of claim 9, further comprising providing the predetermined list by the called party over a telephone call to the privacy system.

16. The method of claim 9, wherein the on list reference comprises 'ON LIST'.

17. The method of claim 9, wherein the privacy system employs AIN signaling.

* * * * *